US012741509B2

(12) United States Patent
Jeong

(10) Patent No.: US 12,741,509 B2
(45) Date of Patent: Sep. 22, 2026

(54) THERMAL MANAGEMENT SYSTEM FOR A VEHICLE

(71) Applicants: HYUNDAI MOTOR COMPANY, Seoul (KR); KIA CORPORATION, Seoul (KR)

(72) Inventor: Seong-Bin Jeong, Seongnam-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 112 days.

(21) Appl. No.: 18/659,622

(22) Filed: May 9, 2024

(65) Prior Publication Data

US 2025/0144978 A1 May 8, 2025

(30) Foreign Application Priority Data

Nov. 6, 2023 (KR) ........................ 10-2023-0151700

(51) Int. Cl.
*B60H 1/32* (2006.01)
*B60H 1/00* (2006.01)

(52) U.S. Cl.
CPC ..... *B60H 1/32284* (2019.05); *B60H 1/00278* (2013.01); *B60H 1/00392* (2013.01)

(58) Field of Classification Search
CPC ............ B60H 1/00278; B60H 1/00392; B60H 1/00485; B60H 1/00885; B60H 1/143; B60H 1/32281; B60H 1/32284; B60H 2001/00307; B60Y 2200/91; F01P 2005/105; F01P 2007/146; Y02E 60/10
See application file for complete search history.

(56) References Cited

U.S. PATENT DOCUMENTS

| | | | | |
|---|---|---|---|---|
| 2021/0309069 A1* | 10/2021 | Kim | .................... | B60H 1/00392 |
| 2021/0379960 A1* | 12/2021 | Kim | .................... | B60H 1/00392 |
| 2021/0379962 A1* | 12/2021 | Kim | .................... | B60H 1/005 |
| 2021/0387505 A1* | 12/2021 | Kim | .................... | B60H 1/143 |
| 2021/0402844 A1* | 12/2021 | Kim | .................... | B60H 1/00392 |
| 2022/0001717 A1* | 1/2022 | Kim | .................... | B60H 1/00921 |
| 2022/0016955 A1* | 1/2022 | Kim | .................... | B60H 1/00278 |
| 2022/0032736 A1* | 2/2022 | Kim | .................... | B60H 1/3205 |
| 2022/0052390 A1* | 2/2022 | Kim | .................... | H01M 10/663 |
| 2023/0065082 A1* | 3/2023 | Jeong | .................... | F04D 29/188 |
| 2023/0226877 A1* | 7/2023 | Hu | .................... | B60L 1/003 62/79 |
| 2024/0010046 A1* | 1/2024 | Kim | .................... | B60H 1/00278 |
| 2024/0190202 A1* | 6/2024 | Jeong | .................... | B60H 1/00278 |
| 2024/0246396 A1* | 7/2024 | Jeong | .................... | B60H 1/00392 |

FOREIGN PATENT DOCUMENTS

| | | | | |
|---|---|---|---|---|
| CN | 115042587 A * | 9/2022 | ......... | B60H 1/00271 |
| CN | 117284056 A * | 12/2023 | ......... | B60H 1/00485 |
| EP | 3954559 A1 * | 2/2022 | ......... | B60H 1/32284 |

* cited by examiner

*Primary Examiner* — Kun Kai Ma
(74) *Attorney, Agent, or Firm* — Lempia Summerfield Katz LLC

(57) ABSTRACT

A thermal management system for a vehicle may adjust the temperature of a battery module by using one chiller where the refrigerant and the coolant may exchange heat with each other and a battery heater for selectively heating the coolant, may perform heating of the vehicle interior by using the coolant heated by the battery heater, may simplify a layout of the system and reduce manufacturing costs by forming a plurality of coolant flowing lines by a single valve according to selected mode of the vehicle.

12 Claims, 4 Drawing Sheets

THERMAL MANAGEMENT SYSTEM FOR A VEHICLE

CROSS-REFERENCE TO RELATED APPLICATION

This application claims priority to and the benefit of Korean Patent Application No. 10-2023-0151700, filed in the Korean Intellectual Property Office on Nov. 6, 2023, the entire contents of which is incorporated herein by reference.

BACKGROUND

(a) Field

The present disclosure relates to a thermal management system for a vehicle. More particularly, the present disclosure relates to a thermal management system for a vehicle capable of adjusting the temperature of a battery module.

(b) Description of the Related Art

In recent years, an electric vehicle has become popular as a future transporting means, as the environment and energy resources are becoming important issues. The electric vehicle uses a battery module in which a plurality of rechargeable cells are formed as one pack as a main power source, and thus no exhaust gas is generated and noise is very low.

Such an electric vehicle is driven by a driving motor which operates through electric power supplied from the battery module. In addition, the electric vehicle includes electrical components for controlling and managing the driving motor as well as a plurality of electronic convenience devices and charging the battery module.

Because a large amount of heat is generated from the battery module, the driving motor used as a primary power source of the electric vehicle, and the electrical components, efficient temperature management (e.g., efficient cooling) of the electrical components and the battery module is desired.

In addition, since a battery module performs optimally at a preset temperature, it needs to be rapidly heated up to the preset temperature in the early stage of driving.

Conventionally, separate cooling systems are applied to adjust the temperature of the electrical components and the battery module. However, it is necessary to increase capacity of the cooling system, which leads to space restrictions. Further, when the capacity of the cooling systems is increased, power required for operating the cooling systems is also increased.

The above information disclosed in this Background section is provided only to enhance understanding of the background of the present disclosure, and therefore it may contain information that does not form the prior art that is already known to a person of ordinary skill in the art.

SUMMARY

The present disclosure provides a thermal management system for a vehicle capable of adjusting the temperature of a battery module by using one chiller where the refrigerant and the coolant exchange heat with each other and a battery heater that selectively heats the coolant. The thermal management system is further capable of heating the vehicle interior by using the coolant heated by the battery heater.

In addition, the present disclosure provides a thermal management system for a vehicle, which is capable of simplifying a layout of the system and reducing manufacturing costs by forming a plurality of coolant flowing lines using a single valve according to a selected mode of the vehicle.

In an embodiment of the present disclosure, a thermal management system for a vehicle may include: a valve module configured to control flow of a coolant that is interiorly introduced according to at least one mode in which a temperature a vehicle interior and a temperature of a battery module are adjusted; and a first line having a first end connected to the valve module to selectively flow the coolant. The first line is provided with the battery module. The thermal management system further includes: a chiller connected to a second end of the first line; a second line configured to selectively flow the coolant and including a first end connected to the chiller and a second end connected to the valve module; and a third line configured to selectively flow the coolant and having a first end connected to the valve module and a second end connected to a battery heater. The thermal management system further includes: a fourth line configured to selectively flow the coolant and having a first end connected to the battery heater and a second end connected to the valve module; a fifth line configured to selectively flow the coolant and having a first end connected to the valve module and a second end connected to a cabin heater; and a sixth line having a first end connected to the cabin heater and a second end connected to the valve module. The sixth line is configured to selectively flow the coolant.

The valve module may include a valve configured to control flow of the interiorly introduced coolant, and at least one water pump provided in the valve.

The at least one water pump may include a first water pump mounted on the valve to correspond to the first line, and a second water pump mounted on the valve to correspond to the fifth line.

The first water pump and the second water pump may be disposed at locations facing each other with respect to the valve.

Depending on the selected at least one mode, the coolant selectively introduced from the second line, the third line, the fourth line, or the sixth line may be selectively discharged through the first line, the fourth line, or the fifth line.

The valve may be configured to selectively discharge the coolant selectively introduced from the second line, or the third line, or the fourth line, or the sixth line, through the first line, or the fourth line, or the fifth line, depending on a selected mode among the at least one mode.

The at least one mode may include a first mode for heating the vehicle interior and cooling the battery module, a second mode for increasing a temperature of the battery module, and a third mode for heating the vehicle interior, and increasing the temperature of the battery module.

In the first mode, the first line is connected to the second line by an operation of the valve module to form an independent closed circuit through which the coolant circulates such that the coolant cooled at the chiller may be supplied to the battery module. The third line, the fourth line, the fifth line, and the sixth line are interconnected by the operation of the valve module such that the coolant may flow along the third line, the fourth line, the fifth line, and the sixth line. The coolant heated while passing through the battery heater is supplied to the cabin heater along the third line and the fifth line connected by the operation of the valve module.

In the second mode, the first line, the second line, the third line, and the fourth line are interconnected by an operation of the valve module such that the coolant heated at the battery heater may be supplied to the battery module. The fifth line and the sixth line are closed by the operation of the valve module, and the first line, the second line, the third line, and the fourth line form an independent closed circuit through which the coolant circulates by the operation of the valve module.

In the third mode, the first line, the second line, the third line, the fourth line, the fifth line, and the sixth line are interconnected by an operation of the valve module such that the coolant heated at the battery heater may be supplied to the battery module and the cabin heater. The coolant heated while passing through the battery heater passes through the cabin heater along the fifth line connected to the third line through the valve module, and then passes through the battery module along the sixth line and the first line.

The chiller may be connected to an air conditioner unit through a refrigerant connection line.

The chiller may be a water-cooled heat-exchanger configured to exchange heat between the interiorly introduced coolant and the refrigerant supplied from the air conditioner unit.

For cooling the battery module by using the coolant heat-exchanged at the chiller, the air conditioner unit may be configured to supply a low-temperature refrigerant to the chiller through the refrigerant connection line.

As described above, according to a thermal management system for a vehicle according to an embodiment, by adjusting the temperature of the battery module by using a battery heater and one chiller where the refrigerant and the coolant are heat-exchanged, and performing heating of the vehicle interior by using the coolant heated by the battery heater, the overall efficiency of the system may be improved.

In addition, according to the present disclosure, by forming a plurality of coolant flowing lines by a single valve according to selected modes of the vehicle, streamlining and simplification of the system may be achieved, and the manufacturing costs may be reduced by removing the PTC heater.

The manufacturing costs may be reduced.

In addition, according to an embodiment, by efficiently adjusting the temperature of the battery module, the optimal performance of the battery module may be enabled, and the overall travel distance of the vehicle may be increased due to the efficient management of the battery module.

In addition, according to an embodiment, it is possible to reduce manufacturing cost and weight through simplification of an entire system, and to improve space utilization.

DETAILED DESCRIPTION

Figure 1:
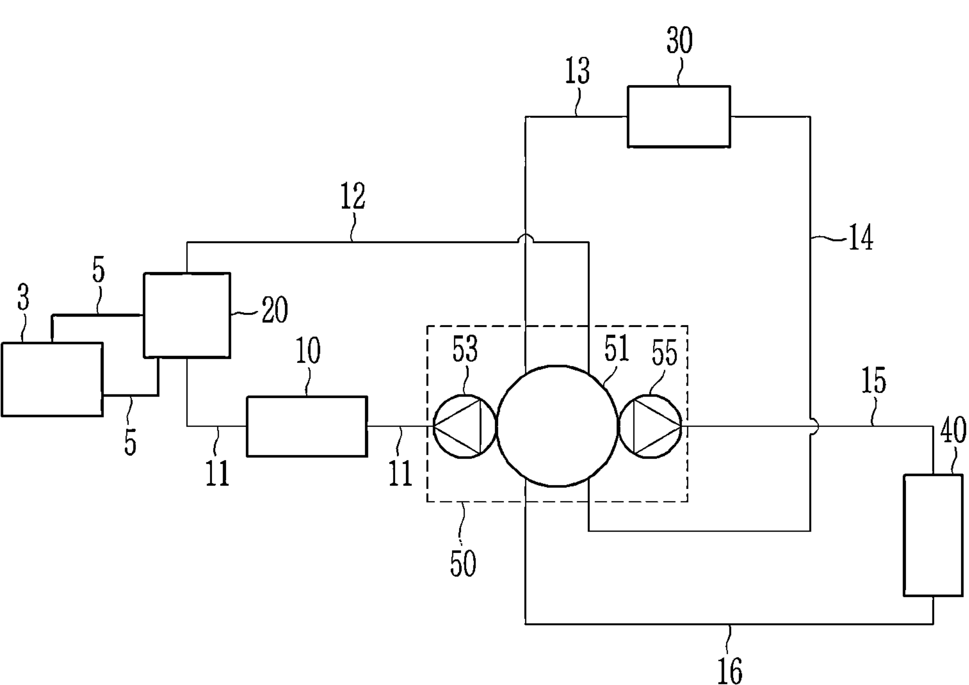
FIG. 1 is a block diagram of a thermal management system for a vehicle according to an embodiment.

Some embodiments are hereinafter described in detail with reference to the accompanying drawings.

Embodiments disclosed in the present specification and the constructions depicted in the drawings are only the example embodiments of the present disclosure, and do not cover the entire scope of the present disclosure. Therefore, it should be understood that there may be various equivalents and variations at the time of the application of this specification.

In order to clarify the present disclosure, parts that are not related to the description are omitted, and the same elements or equivalents are referred to with the same reference numerals throughout the specification.

Also, the size and thickness of each element are arbitrarily shown in the drawings, but the present disclosure is not necessarily limited thereto, and in the drawings, the thickness of layers, films, panels, regions, etc., are exaggerated for clarity.

In addition, unless explicitly described to the contrary, the word "comprise" and variations such as "comprises" or "comprising", should be understood to imply the inclusion of stated elements but not the exclusion of any other elements.

Furthermore, each of terms, such as " . . . unit", " . . . means", " . . . portions", " . . . part", and " . . . member" described in the specification, mean a unit of a comprehensive element that performs at least one function or operation.

When a component, device, element, or the like of the present disclosure is described as having a purpose or performing an operation, function, or the like, the component, device, or element should be considered herein as being "configured to" meet that purpose or to perform that operation or function.

FIG. 1 is a block diagram of a thermal management system for a vehicle according to an embodiment.

According to an embodiment of the present disclosure, a thermal management system for a vehicle may efficiently adjust a temperature of a battery module 10, and perform heating of a vehicle interior by using the coolant heated at the battery heater 30, by using one chiller 20 and a battery heater 30. In particular, a refrigerant and a coolant exchange heat with each other in the chiller 20, and the battery heater 30 is configured to selectively heat the coolant.

In addition, according to the thermal management system, the layout of the system may be simplified, and the manufacturing costs may be reduced, by forming plurality of coolant lines by a single a valve 51 according to a selected mode of the vehicle.

Here, according to the thermal management system, in an electric vehicle, the battery module 10 through which the coolant circulates may be interconnected with an air conditioner unit 3 circulating the refrigerant in order to cool the vehicle interior through the chiller 20.

In other words, referring to FIG. 1, the thermal management system may include a first line 11, a second line 12, a third line 13, a fourth line 14, a fifth line 15, a sixth line 16, a valve module 50, and a cabin heater 40.

The valve module 50 may control flow of the interiorly introduced coolant, according to at least one selected mode in which the temperature of the vehicle interior and the temperature of the battery module 10 are adjusted.

A configuration of the valve module 50 is described in more detail below.

In one embodiment, a first end of the first line 11 may be connected to the valve module 50, and the coolant may selectively flow therethrough. The battery module 10 may be provided on the first line 11.

Here, the chiller 20 may be connected to a second end of the first line 11.

The chiller 20 may be connected to the air conditioner unit 3 through the refrigerant connection line 5. The chiller 20 may be a water-cooled heat-exchanger that exchanges heat between the interiorly introduced coolant and the refrigerant supplied from the air conditioner unit 3.

In order to cool the battery module 10 by using the coolant that exchanges heat at the chiller 20, the air conditioner unit 3 may supply low-temperature refrigerant to the chiller 20 through the refrigerant connection line 5.

In other words, the chiller 20 may adjust a temperature of the coolant by exchanging heat between the selectively supplied coolant and the refrigerant selectively supplied from the air conditioner unit 3.

Here, the chiller 20 may be operated when cooling the battery module 10.

A first end of the second line 12 may be connected to the chiller 20. A second end of the second line 12 may be connected to the valve module 50, and the coolant may selectively flow therethrough.

In the present embodiment, a first end of the third line 13 may be connected to the valve module 50 to selectively flow the coolant. A second end of the third line 13 may be connected to the battery heater 30.

A first end of the fourth line 14 may be connected to the battery heater 30. A second end of the fourth line 14 may be connected to the valve module 50 to selectively flow the coolant.

Here, for increasing the temperature of the battery module 10, or for supplying the high-temperature coolant to the cabin heater 40, the battery heater 30 may be operated to heat the coolant.

The battery heater 30 may be an electrical heater operated with electric power.

When the temperature of the battery module 10 is to be increased or heating of the vehicle interior is required, the battery heater 30 may heat the coolant supplied through the third line 13 and discharge the heated coolant to the fourth line 14.

Accordingly, the coolant whose temperature is increased while passing through the battery heater 30 may be supplied to the cabin heater 40 and the battery module 10 by an operation of the valve module 50.

Therefore, when the temperature of the battery module 10 is to be increased or the vehicle interior is to be heated, the battery heater 30 may selectively operate.

In one form, the cabin heater 40 may be provided inside an HVAC module (not shown). An evaporator provided in the air conditioner unit 3 may be provided together inside the HVAC module.

In one embodiment, a first end of the fifth line 15 may be connected to the valve module 50 to selectively flow the coolant. A second end of the fifth line 15 may be connected to the cabin heater 40.

In addition, a first end of the sixth line 16 may be connected to the cabin heater 40. A second end of the sixth line 16 may be connected to the valve module 50 to selectively flow the coolant.

In one embodiment, the valve module 50 may include the valve 51 configured to control flow of the interiorly introduced coolant, and at least one water pump provided in or on the valve 51.

Here, the at least one water pump may include a first water pump 53 and a second water pump 55.

First, the first water pump 53 may be mounted on the valve 51 to correspond to the first line 11.

In addition, the second water pump 55 may be mounted on the valve 51 to correspond to the third line 13.

Here, the first water pump 53 and the second water pump 55 may be disposed at locations facing each other with respect to the valve 50.

In the present embodiment, the valve 51 may selectively discharge the coolant selectively introduced from the second line 12, the third line 13, the fourth line 14, or the sixth line 16 through the first line 11, the fourth line 14, or the fifth line 15, based on the selected mode among the at least one mode.

Here, the at least one mode may include a first mode to a third mode.

In the first mode, the vehicle interior may be heated and the battery module 10 may be cooled.

In the second mode, the temperature of the battery module 10 may be increased.

In addition, in the third mode, the vehicle interior may be heated, and the temperature of the battery module 10 may be increased.

Hereinafter, an operation and action in each mode of a thermal management system for a vehicle according to an embodiment is described in detail with reference to FIG. 2 to FIG. 4.

According to an embodiment, an operation in the first mode of a thermal management system, which is for heating the vehicle interior and cool the battery module 10, is described in detail with reference to FIG. 2.

Figure 2:
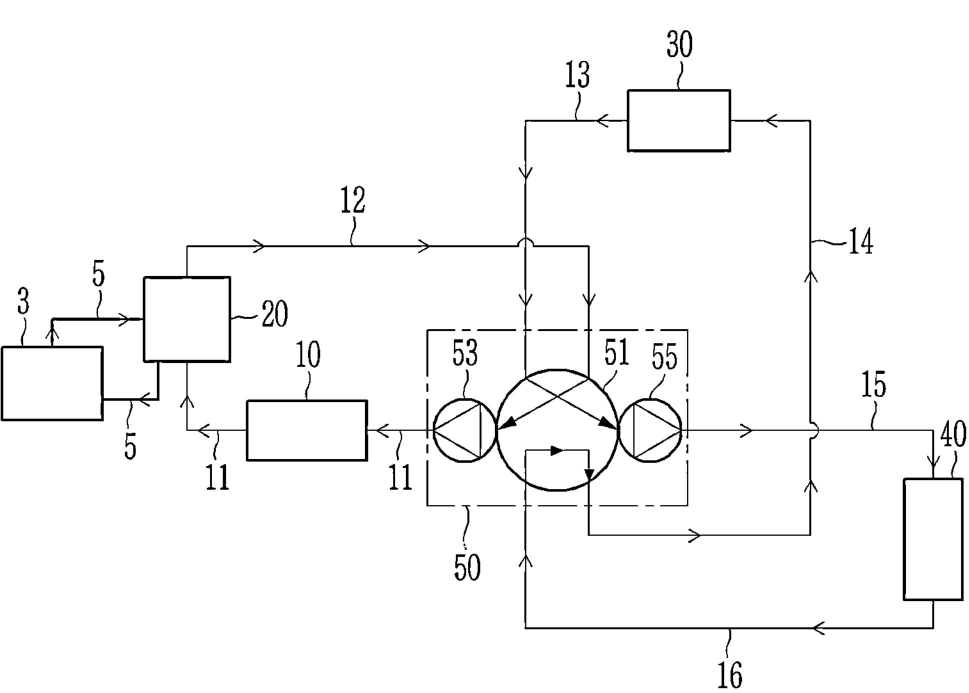
FIG. 2 is an operation diagram according to a first mode of a thermal management system for a vehicle according to an embodiment.

FIG. 2 is an operation diagram according to the first mode of a heat pump system for a vehicle according to an embodiment.

Referring to FIG. 2, in the first mode, the first line 11 may be connected to the second line 12 by an operation of the valve 51 such that the coolant cooled at the chiller 20 may be supplied to the battery module 10.

Accordingly, the first line 11 and the second line 12 may form an independent closed circuit through which the coolant circulates by the operation of the valve module 50.

Here, the air conditioner unit 3 may operate such that the refrigerant may be supplied to the chiller 20 through the refrigerant connection line 5.

Then, the chiller 20 may cool the introduced coolant through heat-exchange with the refrigerant such that the low-temperature coolant may be supplied to the battery module 10.

In addition, the third line 13, the fourth line 14, the fifth line 15, and the sixth line 16 may be interconnected by the operation of the valve 51 such that the coolant may flow along the third line 13, the fourth line 14, the fifth line 15, and the sixth line 16.

In such a state, when the first water pump 53 and the second water pump 55 each operates, the coolant having passed through the battery module 10 along the first line 11 may flow into the chiller 20, and then be discharged through the second line 12.

The coolant flowing along the second line 12 may flow into the first line 11 connected by the operation of the valve 51.

In other words, when the first water pump 53 operates, the coolant may circulate along the first line 11 and the second line 12.

At this time, the coolant cooled through heat-exchange with the low-temperature refrigerant while passing through the chiller 20 may by introduced into the battery module 10 by an operation of the valve module 50 and the first water pump 53. Accordingly, the battery module 10 may be more efficiently cooled.

Meanwhile, when the second water pump 55 operates, the coolant flowing from the valve module 50 to the fifth line 15 may pass through the cabin heater 40, and then be discharged to the sixth line 16.

The coolant introduced into the valve 51 through the sixth line 16 may flow along the fourth line 14 connected by the valve 51, and thereby may pass through the battery heater 30.

At this time, the battery heater 30 may be operated to increase the temperature of the coolant by heating the introduced coolant. The coolant whose temperature is increased may be introduced into the valve module 50 along the third line 13, and then be discharged to the fifth line 15 connected by the valve 51.

In other words, the coolant heated while passing through the battery heater 30 may be supplied to the cabin heater 40 along the third line 13 and the fifth line 15 connected by the operation of the valve module 50.

Accordingly, the ambient air introduced from the outside may be converted to a high-temperature state while passing through the cabin heater 40 and then introduced into the vehicle interior, thereby implementing heating of the vehicle interior.

In other words, while repeatedly performing above-described processes, the coolant cooled at the chiller 20 may cool the battery module 10 to prevent overheating.

In addition, as the coolant heated while passing through the battery heater 30 is supplied to the cabin heater 40, the ambient air introduced into the HVAC module (not shown) may be converted to a high-temperature state while passing through the cabin heater 40 and then introduced into the vehicle interior, thereby implementing heating of the vehicle interior.

In another embodiment, an operation in the second mode for increasing the temperature of the battery module 10 is described in detail with reference to FIG. 3.

Figure 3:
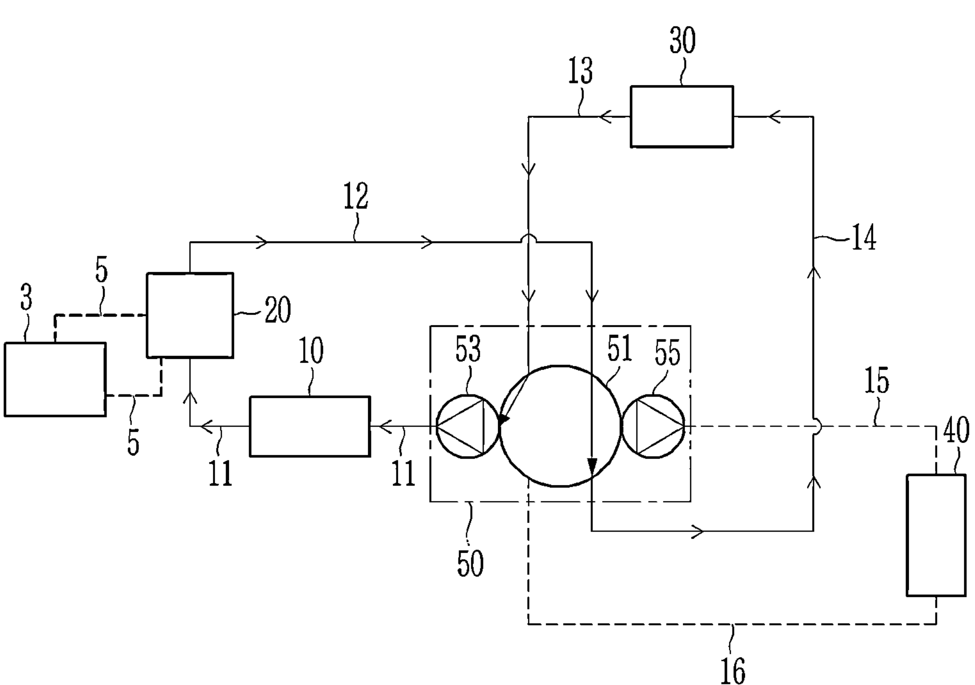
FIG. 3 is an operation diagram according to a second mode of a thermal management system for a vehicle according to an embodiment.

FIG. 3 is an operation diagram according to the second mode of a thermal management system for a vehicle according to an embodiment.

Referring to FIG. 3, in the second mode, the first line 11, the second line 12, the third line 13, and the fourth line 14 may be interconnected by the operation of the valve 51 such that the coolant heated at the battery heater 30 may be supplied to the battery module 10.

Simultaneously, the fifth line 15 and the sixth line 16 may be closed by the operation of the valve module 50. In this case, the second water pump 55 may not operate.

In addition, the air conditioner unit 3 may not operate. Therefore, the refrigerant connection line 5 may be closed.

Accordingly, the first line 11, the second line 12, the third line 13, and the fourth line 14 may form an independent closed circuit through which the coolant circulates by the operation of the valve module 50.

In such a state, when the first water pump 53 operates, the coolant discharged from the valve 51 to the first line 11 may pass through the battery module 10 along the first line 11, and then flow into the chiller 20.

The coolant having passed through the chiller 20 may flow into the valve 51 along the second line 12. Thereafter, the coolant may be discharged to the fourth line 14 connected the valve 51. The coolant flowing along the fourth line 14 may pass through the battery heater 30.

At this time, the battery heater 30 may be operated to increase the temperature of the coolant by heating the introduced coolant. The coolant whose temperature is increased may flow into the valve 51 along the third line 13. Thereafter, the coolant may be discharged to the first line 11 connected by the valve 51, and may be supplied to the battery module 10.

As such, while repeatedly performing above-described processes, the coolant whose temperature is increased at the battery heater 30 may increase the temperature of the battery module 10 more rapidly.

In addition, an operation according to the third mode of in the thermal management system, which is for heating the vehicle interior and increasing the temperature of the battery module 10, is described in detail with reference to FIG. 4.

Figure 4:
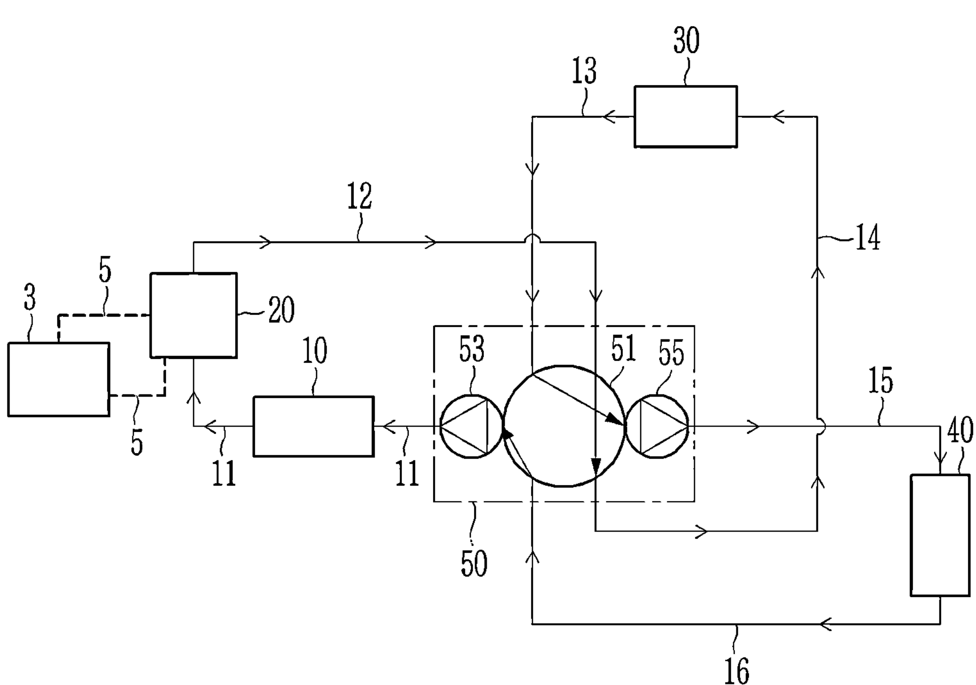
FIG. 4 is an operation diagram according to a third mode of a thermal management system for a vehicle according to an embodiment.

FIG. 4 is an operation diagram according to the third mode of a thermal management system for a vehicle according to an embodiment.

Referring to FIG. 4, the first line 11, the second line 12, the third line 13, the fourth line 14, the fifth line 15, and the sixth line 16 may be interconnected by the operation of the valve module 50 such that the coolant heated at the battery heater 30 may be supplied to the battery module 10 and the cabin heater 40.

In more detail, the second line 12 may be connected to the fourth line 14 by the operation of the valve 51. The third line 13 may be connected to the fifth line 15 by the operation of the valve 51.

In addition, the sixth line 16 may be connected to the first line 11 by the operation of the valve 51.

Accordingly, the first line 11, the second line 12, the third line 13, the fourth line 14, the fifth line 15, and the sixth line 16 may form one closed circuit through which the coolant circulates by the operation of the valve module 50.

In such a state, when the first water pump 53 and the second water pump 55 each operates, the coolant discharged from the valve 51 to the first line 11 may sequentially pass through the battery module 10 and the chiller 20 along the first line 11. Thereafter, the coolant may flow into the valve 51 along the second line 12.

Meanwhile, the air conditioner unit 3 may not operate. Therefore, the refrigerant connection line 5 may be closed.

The coolant introduced into the valve 51 along the second line 12 may be discharged to the fourth line 14. The coolant flowing along the fourth line 14 may pass through the battery heater 30.

At this time, the battery heater 30 may be operated to increase the temperature of the coolant by heating the introduced coolant. The coolant whose temperature is increased may flow into the valve 51 along the third line 13.

Then, the coolant introduced into the valve 51 along the third line 13 may be discharged to the fifth line 15.

The coolant flowing along the fifth line 15 may pass through the cabin heater 40, and then flow along the sixth line 16.

At this time, the ambient air introduced from the outside may be converted to a high-temperature state while passing through the cabin heater 40 and then introduced into the vehicle interior, thereby implementing heating of the vehicle interior.

Meanwhile, the coolant introduced into the valve 51 from the cabin heater 40 along the sixth line 16 may be discharged to the first line 11. The coolant discharged to the first line 11 may be supplied to the battery module 10.

As such, while repeatedly performing above-described processes, the coolant heated while passing through the battery heater 30 may first pass through the cabin heater 40 along the fifth line 15 connected to the third line 13 through the valve module 50.

Then, the coolant having passed through the cabin heater 40 may, while passing through the battery module 10 along the sixth line 16 and the first line 11, heat the vehicle interior, and at the same time, increase the temperature of the battery module 10.

Therefore, as described above, by applying a thermal management system for a vehicle according to an embodiment, the refrigerant and the coolant may adjust the temperature of the battery module 10 by using one chiller 20 and the battery heater 30, and perform heating of the vehicle interior by using the coolant heated at the battery heater 30, and therefore, the overall efficiency of the system may be improved.

In addition, according to the present disclosure, by forming a plurality of coolant flowing lines by a single the valve 51 according to the selected mode of the vehicle, streamlining and simplification of the system may be achieved while reducing manufacturing costs by removing the PCT heater.

In addition, according to an embodiment, by efficiently adjusting the temperature of the battery module 10, the optimal performance of the battery module 10 may be enabled, and the overall travel distance of the vehicle may be increased due to the efficient management of the battery module 10.

In addition, according to an embodiment, it is possible to reduce manufacturing cost and weight through simplification of an entire system, and to improve space utilization.

While the present disclosure has been described in connection with what is presently considered to be practical embodiments, it should be understood that the present disclosure is not limited to the disclosed embodiments. On the contrary, it is intended to cover various modifications and equivalent arrangements included within the spirit and scope of the appended claims.

DESCRIPTION OF SYMBOLS

3: air conditioner unit
5: refrigerant connection line
10: battery module
11, 12, 13: first, second, and third line
14, 15, 16: fourth, fifth, and sixth line
20: chiller
30: battery heater
40: cabin heater
50: valve module
51: valve
53: first water pump
55: second water pump

What is claimed is:

1. A thermal management system for a vehicle, comprising:

a valve module configured to control flow of a coolant according to at least one mode in which at least one of a temperature of a vehicle interior or a temperature of a battery module is adjusted;

a first line provided with the battery module and including a first end connected to the valve module to selectively flow the coolant;

a chiller connected to a second end of the first line;

a second line including a first end connected to the chiller and a second end connected to the valve module and configured to selectively flow the coolant;

a third line including a first end connected to the valve module and a second end connected to a battery heater and configured to selectively flow the coolant;

a fourth line including a first end connected to the battery heater and a second end connected to the valve module and configured to selectively flow the coolant;

a fifth line including a first end connected to the valve module and a second end connected to a cabin heater and configured to selectively flow the coolant; and a sixth line including a first end connected to the cabin heater and a second end connected to the valve module and configured to selectively flow the coolant.

2. The thermal management system of claim 1, wherein the valve module comprises:

a valve configured to control flow of the coolant; and at least one water pump provided in the valve.

3. The thermal management system of claim 2, wherein the at least one water pump comprises:

a first water pump mounted on the valve to correspond to the first line; and a second water pump mounted on the valve to correspond to the fifth line.

4. The thermal management system of claim 3, wherein the first water pump and the second water pump are disposed at locations facing each other with respect to the valve.

5. The thermal management system of claim 2, wherein the valve is configured to selectively discharge the coolant selectively introduced from the second line, the third line, the fourth line, or the sixth line, through the first line, the fourth line, or the fifth line, depending on a selected mode among the at least one mode.

6. The thermal management system of claim 1, wherein the at least one mode comprises:

a first mode for heating the vehicle interior and cooling the battery module;

a second mode for increasing a temperature of the battery module; and a third mode for heating the vehicle interior and increasing the temperature of the battery module.

7. The thermal management system of claim 6, wherein, in the first mode:

the first line is connected to the second line by an operation of the valve module to form an independent closed circuit through which the coolant circulates such that the coolant cooled at the chiller is supplied to the battery module;

the third line, the fourth line, the fifth line, and the sixth line are interconnected by the operation of the valve module such that the coolant flows along the third line, the fourth line, the fifth line, and the sixth line; and the coolant heated while passing through the battery heater is supplied to the cabin heater along the third line and the fifth line connected by the operation of the valve module.

8. The thermal management system of claim 6, wherein, in the second mode:

the first line, the second line, the third line, and the fourth line are interconnected by an operation of the valve module such that the coolant heated at the battery heater is supplied to the battery module;

the fifth line and the sixth line are closed by the operation of the valve module; and the first line, the second line, the third line, and the fourth line form an independent closed circuit through which the coolant circulates by the operation of the valve module.

9. The thermal management system of claim 6, wherein, in the third mode:

the first line, the second line, the third line, the fourth line, the fifth line, and the sixth line are interconnected by an operation of the valve module such that the coolant heated at the battery heater is supplied to the battery module and the cabin heater; and the coolant heated while passing through the battery heater passes through the cabin heater along the fifth line connected to the third line through the valve module, and then passes through the battery module along the sixth line and the first line.

10. The thermal management system of claim 1, wherein the chiller is connected to an air conditioner unit through a refrigerant connection line.

11. The thermal management system of claim 10, wherein the chiller is a water-cooled heat-exchanger configured to exchange heat between interiorly introduced coolant with a refrigerant supplied from the air conditioner unit.

12. The thermal management system of claim 10, wherein the air conditioner unit is configured to supply a low-temperature refrigerant to the chiller through the refrigerant connection line such that the battery module is cooled by the coolant that has exchanged heat with the low-temperature refrigerant at the chiller.

* * * * *